US011847335B2

(12) United States Patent
Shukla et al.

(10) Patent No.: US 11,847,335 B2
(45) Date of Patent: Dec. 19, 2023

(54) LATENT READ DISTURB MITIGATION IN MEMORY DEVICES

(71) Applicant: Micron Technology, Inc., Boise, ID (US)

(72) Inventors: Pitamber Shukla, Boise, ID (US); Scott Anthony Stoller, Boise, ID (US); Niccolo' Righetti, Boise, ID (US); Giuseppina Puzzilli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/212,437

(22) Filed: Mar. 25, 2021

(65) Prior Publication Data

US 2022/0308778 A1   Sep. 29, 2022

(51) Int. Cl.
*G06F 3/06* (2006.01)

(52) U.S. Cl.
CPC .......... *G06F 3/0647* (2013.01); *G06F 3/0604* (2013.01); *G06F 3/0625* (2013.01); *G06F 3/0679* (2013.01)

(58) Field of Classification Search
CPC .... G06F 3/0679; G06F 3/0625; G06F 3/0604; G06F 3/0647
See application file for complete search history.

(56) References Cited

U.S. PATENT DOCUMENTS

| 2008/0101122 | A1* | 5/2008 | Kang ..................... G11C 16/26 365/185.17 |
| 2020/0258558 | A1* | 8/2020 | Prakash ............. G11C 16/3427 |
| 2020/0393973 | A1* | 12/2020 | Reusswig ........... G06F 12/0246 |
| 2021/0149800 | A1* | 5/2021 | Yang .................. G06F 12/0246 |
| 2021/0280264 | A1* | 9/2021 | Ramachandran Nair .................... G11C 29/42 |

FOREIGN PATENT DOCUMENTS

CN   115132263 A   9/2022

* cited by examiner

*Primary Examiner* — Edward J Dudek, Jr.
(74) *Attorney, Agent, or Firm* — Schwegman Lundberg & Woessner, P.A.

(57) ABSTRACT

A trigger condition associated with latent read disturb in a memory device is detected. In response to detecting the trigger condition associated with latent read disturb, one or more blocks in the memory device that are impacted by the trigger condition are placed in a stable state to mitigate latent read disturb in the one or more blocks.

20 Claims, 4 Drawing Sheets

LATENT READ DISTURB MITIGATION IN MEMORY DEVICES

TECHNICAL FIELD

Embodiments of the disclosure relate generally to memory sub-systems and, more specifically, to mitigating latent read disturb in a memory device.

BACKGROUND

A memory sub-system can include one or more memory devices that store data. The memory components can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
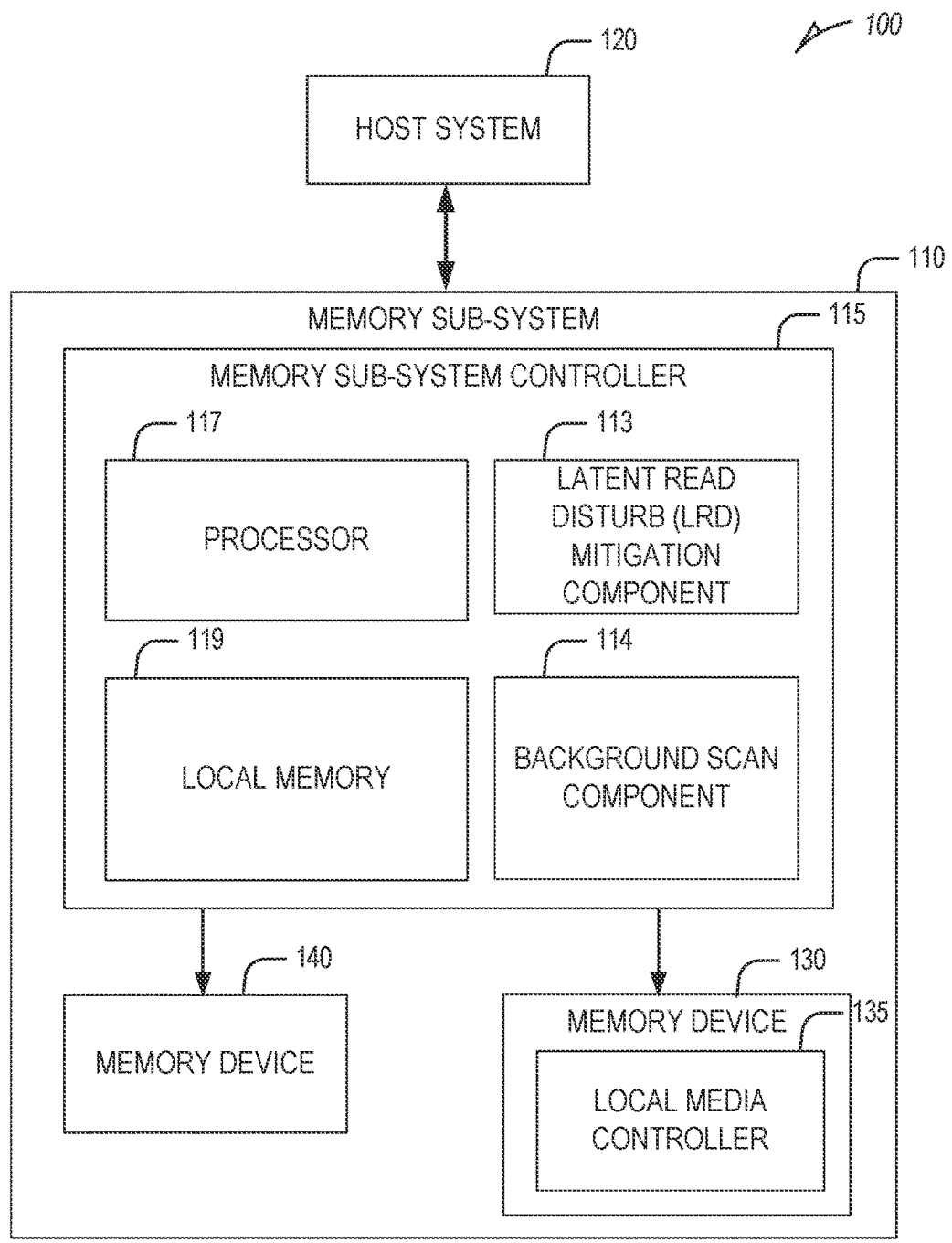
FIG. 1 illustrates an example computing system that includes a memory sub-system, in accordance with some embodiments of the present disclosure.

Aspects of the present disclosure are directed to mitigating latent read disturb in memory devices of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1. Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

Some memory devices (e.g., NAND memory devices) include an array of memory cells (e.g., flash cells) to store data. Each cell includes a transistor and within each cell, data is stored as the threshold voltage of the transistor, based on the logical value of the cell (e.g., 0 or 1). During a read operation, a read reference voltage is applied to the transistor, and if the read reference voltage is higher than the threshold voltage of the cell, the transistor is programmed and is recognized by a memory sub-system as a binary value of 0. Memory cells in these devices can be grouped as pages that can refer to a logical unit of the memory device used to store data. With some types of memory devices (e.g., NAND), pages are grouped to form blocks (also referred to herein as "memory blocks").

A background scan operation can run in the background of a memory sub-system (e.g., during idle periods in which the memory sub-system is not performing other operations in response to a host-initiated command). Memory device background scanning can begin by reading a section of a memory device, such as a codeword, a block, or a portion of a block. The background scan can track the number of bit corrections needed in order to determine the quality of that section of memory. The background scan can also determine whether sections are not correctable. The section of memory can be analyzed to determine a metric (e.g., in terms of amount or type of error correction required, estimated remaining life, amount of cells functioning below a threshold level, the section not being correctable by the ECC engine, etc). If the metric is above a threshold, the background scan can proceed to a next memory section. If the metric is below the threshold, the background scan can attempt corrective measures, such as by performing a refresh relocation event on the memory section or a memory portion related to the memory section. For example, if a portion of a block is read and determined to have a metric below the threshold, a refresh relocation event can be performed for the block containing the read portion.

NAND structures observe a unique intrinsic cell reliability degradation mechanism in which read NAND flash memory can cause nearby cells in the same block to change over time. This is known as read disturb. Latent read disturb (LRD) is a read disturb mechanism caused when there is a delay between reads on a device (e.g., 10 seconds or so). LRD is caused by an interaction between the floating body and word lines during the last phase of a multi-phase read operation in a memory device. After each read operation, the word line voltage ramps down to specified voltage level (e.g., Ground→0V) and then the floating NAND channel couples down with the word lines (0V→4V), reaching a negative potential. The word lines and floating NAND channel potential follow each other unless the floating channel discharges through pillar junctions, which might take several minutes depending on NAND temperature. As a result, the delay between two successive read operations will cause the application of a low positive gate voltage to NAND cells for a very long time, which causes the degradation to the NAND structure. For example, in a matter of days, the NAND cells can experience significant charge loss and charge gain as a result of this LRD mechanism.

Aspects of the present disclosure mitigate LRD in memory devices by placing blocks into a stable state under certain conditions. LRD does not occur while a block is in the stable state. A LRD mitigation component of a memory sub-system monitors trigger conditions associated with a memory device, and when the LRD mitigation component detects a trigger condition associated with a block, the LRD mitigation component causes the block to transition to the stable state by providing a command to the memory device. The trigger condition indicates that the block is not likely to be accessed (e.g., read) in the near term. As examples, detecting the trigger condition can include detecting a background scan being performed on the block (e.g., a background scan being performed on a portion of the block such as a page or on the entirety of the block), detecting an impending power down of the block, or detecting a power state transition of the block (e.g., if the device enters a low power state where a long idle delay is anticipated). Hence, the LRD mitigation component can place a block into the stable state based on the LRD mitigation component detecting a background scan being performed on the block (e.g., a portion of the block such as a page or an entire block), based on the LRD mitigation component detecting an impending power down event that impacts the block, or based on the LRD mitigation component detecting a power state transition of the block. In instances in which the LRD mitigation component places a block into the stable state based on detecting a background scan being performed, the LRD mitigation component places the block into the stable state before the background scan moves to another block.

By transitioning blocks into the stable state based on a background scans, power down events, and power state transitions, the LRD mitigation component mitigates the effects of LRD that are caused by background scans and will also aid memory devices that are powered on regularly only for a handful of reads and powered off or put in low power state (e.g., a mobile or client solid state drive (SSD)). This LRD mitigation technique also allows flexibility for memory sub-systems to choose between page fast scans and block fast scan.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a host interface. Examples of a host interface include, but are not limited to, a SATA interface, a PCIe interface, USB interface, Fibre Channel, Serial Attached SCSI (SAS), Small Computer System Interface (SCSI), a double data rate (DDR) memory bus, a DIMM interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and 3D NAND.

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include a local media controller 135 that operates in conjunction with memory sub-system controller 115 to execute operations on one or more memory cells of the memory devices 130.

The memory sub-system 110 also includes a background scan component 114 that is responsible for managing and performing background scans on the memory devices 130 and 140. During a background scan, the background scan component 114 reads data from a portion of one of the memory devices 130 or 140 (e.g., a page, a block, or a portion of a block) to determine a metric (e.g., in terms of amount or type of error correction required, estimated remaining life, amount of cells functioning below a threshold level, the section not being correctable by the ECC engine) and if the metric is below a threshold, corrective actions are performed by the memory sub-system controller 115, such as by performing a refresh relocation event on the portion of the memory device from which the data was read. In performing background scans, the background scan component 114 can scan a single block or portion thereof, or can move from block to block while scanning portions of each. That is, consistent with some embodiments, a background scan can include scanning a first page in a first block before scanning a second page in a second block, and so forth.

The memory sub-system further includes a latent read disturb (LRD) mitigation component 113 to mitigate the LRD mechanism at the memory devices 130 and 140 that is caused by system workloads as well as background scans performed by the background scan component 114. In order to reduce the effects caused by the LRD mechanism, the LRD mitigation component 113 can transition a block in one of the memory devices 130 or 140 to a stable state under certain conditions. While a block is in the stable state, LRD does not occur. The LRD mitigation component 113 can transition a block to the stable state any time it is unlikely for the block to be read soon. For example, the LRD mitigation component 113 can place a block in a stable state in response to detecting a triggering condition such as a background scan being performed on the block, a power state transition of the block, or upon detecting an imminent power down event.

In some embodiments, the memory sub-system controller 115 includes at least a portion of the LRD mitigation component 113. For example, the memory sub-system controller 115 can include a processor 117 (processing device) configured to execute instructions stored in local memory 119 for performing the operations described herein. In some embodiments, the LRD mitigation component 113 is part of the host system 120, an application, or an operating system. In some embodiments, the local media controller 135 includes at least a portion of the LRD mitigation component 113.

Figure 2:
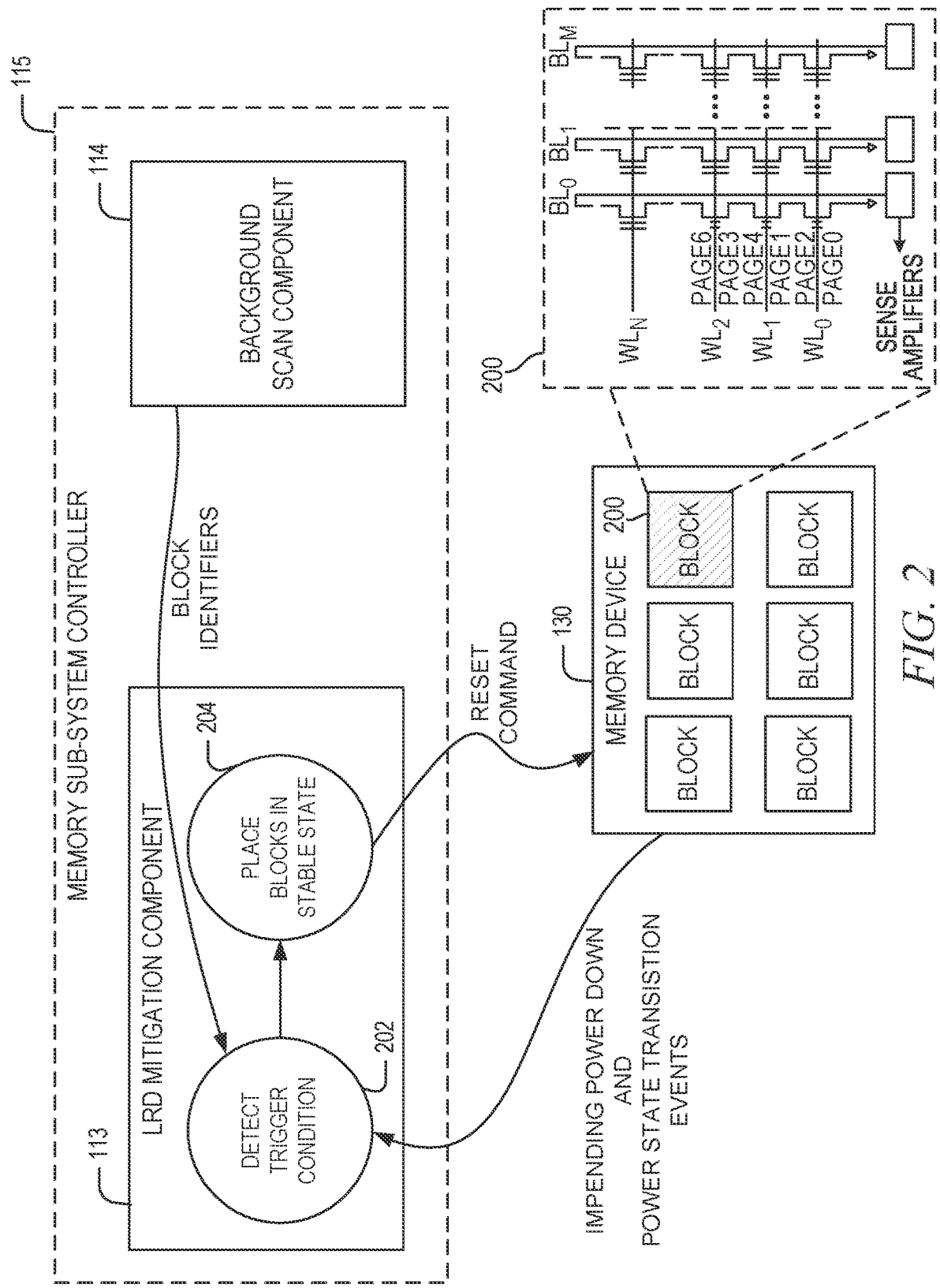
FIG. 2 is a data flow diagram illustrating interactions between components of the memory sub-system in mitigating a latent read disturb mechanism in a memory device, in accordance with some embodiments of the present disclosure.

FIG. 2 is a data flow diagram illustrating interactions between components of the memory sub-system in performing adaptive background scanning, in accordance with some embodiments of the present disclosure. In the example illustrated in FIG. 2, the memory device 130 is a NAND memory device including multiple memory blocks.

As shown, a NAND block includes an array (2D or 3D) of pages (rows) and strings (columns). Each NAND cell includes a transistor, and within each cell, data is stored as the threshold voltage of the transistor, based on the logical value of the cell (e.g., 0 or 1). Strings are connected within the NAND block 200 to allow storage and retrieval of data from selected cells. NAND cells in the same column are connected in series to form a bit line (BL). All cells in a bit line are connected to a common ground on one end and a common sense amplifier on the other for reading the threshold voltage of one of the cells when decoding data. NAND cells are connected horizontally at their control gates to a word line (WL) to form a page. A page is a set of connected cells that share the same word line and is the minimum unit to program.

At 202, the LRD mitigation component 113 detects a trigger condition for transitioning the block 200 into a stable state. Detecting the trigger condition can include either detecting a background scan being performed on the block 200 or detecting an impending power down of the block 200. Accordingly, the LRD mitigation component 113 can detect the trigger condition based on a signal received from the memory device 130 that indicates an impending power down event or power state transitions, or based on identifiers of blocks for which a background scan has been performed received from the background scan component 114. In some instances, detecting a background scan being performed on the block 200 includes detecting a background scan being performed on a page of the block 200.

In response to detecting the trigger condition, the LRD mitigation component 113 (at 204) places the block 200 in a stable state in which LRD does not occur. To place the block 200 into the stable state, the LRD mitigation component 113 transmits one or more commands to the memory device 130 that cause the memory device 130 to transition the block 200 to the stable state. For example, the LRD mitigation component 113 can send a reset command (e.g., a Body Reset command) to the memory device 130 to cause the memory device 130 to transition the block 200 to the stable state by grounding word lines in the block 200, instead of leaving them grounded or floated. In instances in which the LRD mitigation component 113 places the block 200 in the stable state based on detecting a background scan being performed on a page of the block 200, the LRD mitigation component 113 places the block 200 in the stable state before the background scan moves to another page in another block.

Figure 3:
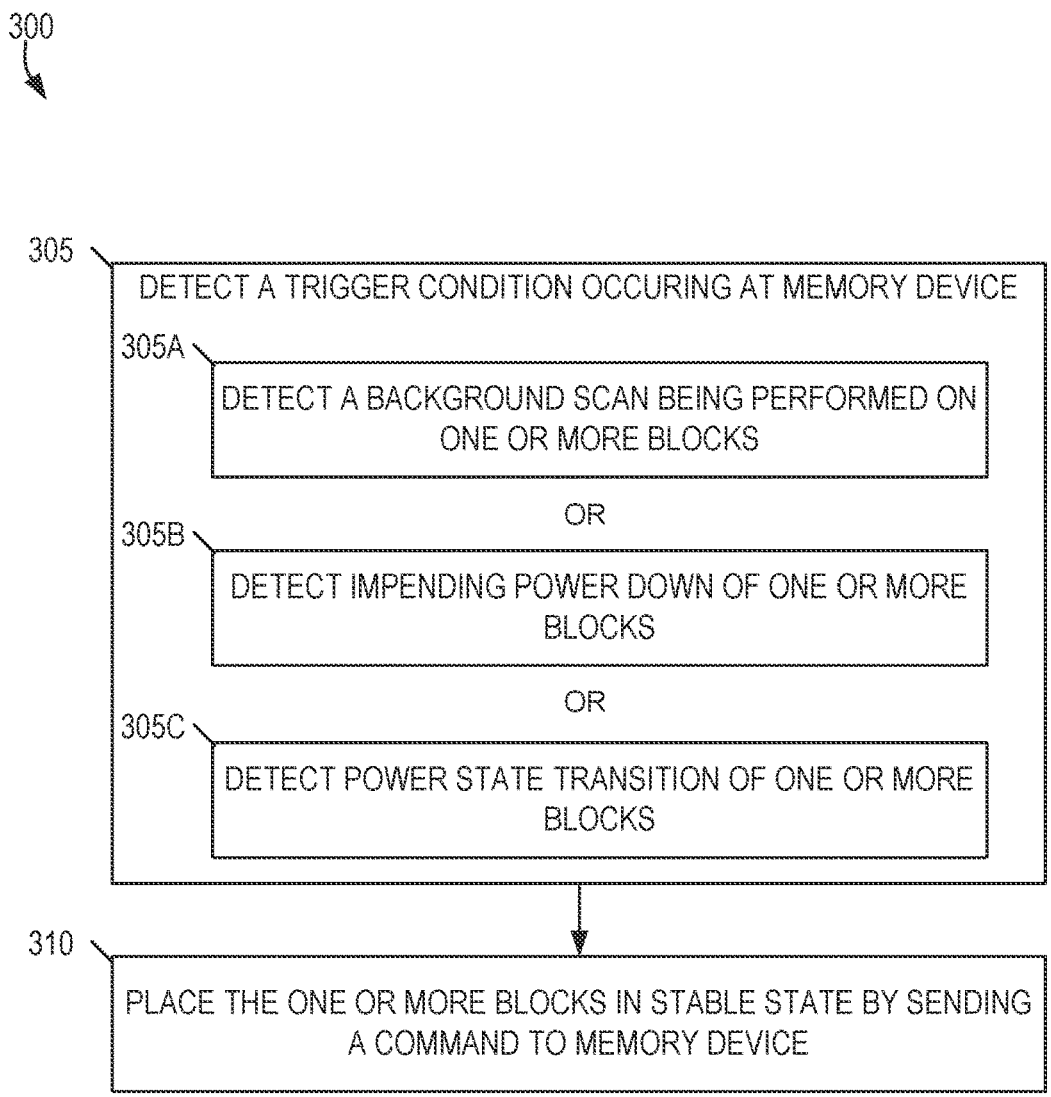
FIG. 3 is a flow diagram illustrating an example method for mitigating a latent read disturb mechanism in a memory device, in accordance with some embodiments of the present disclosure.

FIG. 3 is a flow diagram illustrating an example method 300 for mitigating a latent read disturb mechanism in a memory device of a memory sub-system (e.g., the memory sub-system 110) in accordance with some embodiments of the present disclosure. The method 300 can be performed by processing logic that can includes hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the LRD mitigation component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device detects a trigger condition. In some instances, the trigger condition can indicate that one or more programmed blocks in a memory device are unlikely to be accessed for an extended period of time. For example, as shown, detecting the trigger condition can include either: detecting a background scan being performed on one or more programmed blocks (305A), detecting an impending power down of the one or more programmed blocks (305B), or detecting a power state transition of one or more programmed blocks (e.g., when the one or more programmed blocks are placed in a low power state). To detect the background scan, the processing device can monitor the background scan performed by a background scanning component such as by routinely accessing error event data generated by the background scanning component to indicate a result of the background scan. The detecting of the background scan being performed can include detecting a background scan being performed on a portion of a block such as background scan being performed on a page of the block. The processing device can detect the impending power down event or power state transition based on a signal received from the memory device that indicates that the power down event is impending or that the power state transition has occurred.

At operation 310, the processing device places the one or more blocks in a stable state based on detecting the trigger condition. To place the one or more blocks in the stable state, the processing device sends a command to the processing device. For example, the processing device can send a body reset command to the memory device. The command provided by the processing device causes the memory device to transition the one or more blocks to a stable state by grounding the word lines of the one or more blocks (rather than leaving them floating). The processing device places the one or more blocks in the stable state to mitigate latent read disturb in the one or more blocks. In instances in which the processing device places a block into the stable state based on detecting a background scan being performed on a page within the block, the processing device places the block into the stable state before the background scan moves to another block.

In placing the one or more blocks in the stable state, the processing device can place a sub-set of programmed blocks in the memory device in the stable state (e.g., a sub-set of programmed blocks at which a background scan was performed) or the processing device can place an entire set of programmed blocks in the memory device in the stable state (e.g., based on detecting an impending power down that impacts the entire set of blocks of the memory device).

Described implementations of the subject matter can include one or more of the features described herein, alone or in combination Example 1 is system comprising: a memory device; and a processing device, operatively coupled with the memory device, to perform operations comprising: detecting a trigger condition associated with latent read disturb in the memory device; and in response to detecting the trigger condition, placing one or more blocks of the memory device that are impacted by the trigger condition in a stable state to mitigate latent read disturb in the one or more blocks.

Example 2 includes the system of example 1, wherein the detecting of the trigger condition comprises detecting a background scan being performed on the one or more blocks.

Example 3 includes the system of any one or more of examples 1 or 2, wherein detecting the background scan being performed on the one or more blocks comprises detecting a background scan being performed on a page in one of the one or more blocks.

Example 4 includes the system of any one or more of examples 1-3, wherein the detecting of the trigger condition comprises detecting an impending power down event at the memory device.

Example 4 includes the system of any one or more of examples 1-4, wherein the detecting of the trigger condition comprises detecting a power state transition of the one or more blocks.

Example 6 includes the system of any one or more of examples 1-5, wherein the placing of the one or more blocks of the memory device in the stable state comprises sending a command to the memory device that causes the memory device to ground word lines in the one or more blocks.

Example 7 includes the system of any one or more of examples 1-6, wherein: the memory device comprises a set of blocks; and the placing of the one or more blocks of the memory device in the stable state comprises placing the set of blocks in the stable state based on detecting the trigger condition.

Example 8 is a method comprising: detecting, by a processing device, a trigger condition associated with latent read disturb in a memory device; and in response to detecting the trigger condition, placing, by the processing device, one or more blocks of the memory device that are impacted by the trigger condition in a stable state to mitigate latent read disturb in the one or more blocks.

Example 9 includes the method of example 8, wherein the detecting of the trigger condition comprises detecting a background scan being performed on the one or more blocks.

Example 10 includes the method of any one or more of examples 8 or 9, wherein the detecting of the trigger condition comprises one of: detecting an impending power down event at the memory device; and detecting a power state transition of the one or more blocks.

Example 11 includes the method of any one or more of examples 8-11, wherein the placing of the one or more blocks of the memory device in the stable state comprises sending a command to the memory device.

Example 12 includes the method of any one or more of examples 8-12, wherein the command causes the memory device to ground word lines in the one or more blocks.

Example 13 includes the method of any one or more of examples 8-13, wherein: the memory device comprises a set of blocks; and the placing of the one or more blocks of the memory device in the stable state comprises placing the set of blocks in the stable state based on detecting the trigger condition.

Example 14 includes the method of any one or more of examples 8-14, wherein: the memory device comprises a set of blocks; and the placing of the one or more blocks of the memory device in the stable state comprises placing a sub-set of blocks from the set of blocks in the stable state based on detecting the trigger condition.

Example 15 is a computer-readable storage medium comprising instructions that, when executed by a processing device, configure the processing device to perform operations comprising: detecting a trigger condition associated with latent read disturb in a memory device; and in response to detecting the trigger condition, placing one or more blocks of the memory device that are impacted by the trigger condition in a stable state to mitigate latent read disturb in the one or more blocks.

Example 16 includes the computer-readable medium of example 15, wherein the detecting of the trigger condition comprises detecting a background scan being performed on the one or more blocks.

Example 17 includes the computer-readable medium of any one or more of examples 15 or 16, wherein the detecting of the trigger condition comprises detecting an impending power down event at the memory device.

Example 18 includes the computer-readable medium of any one or more of examples 15-17, wherein the placing of the one or more blocks of the memory device in the stable state comprises sending a command to the memory device.

Example 19 includes the computer-readable medium of any one or more of examples 15-18, wherein the command causes the memory device to ground word lines in the one or more blocks.

Example 20 includes the computer-readable medium of any one or more of examples 15-19, wherein: the memory device comprises a set of blocks; and the placing of the one or more blocks of the memory device in the stable state comprises placing the set of blocks in the stable state based on detecting the trigger condition.

Figure 4:
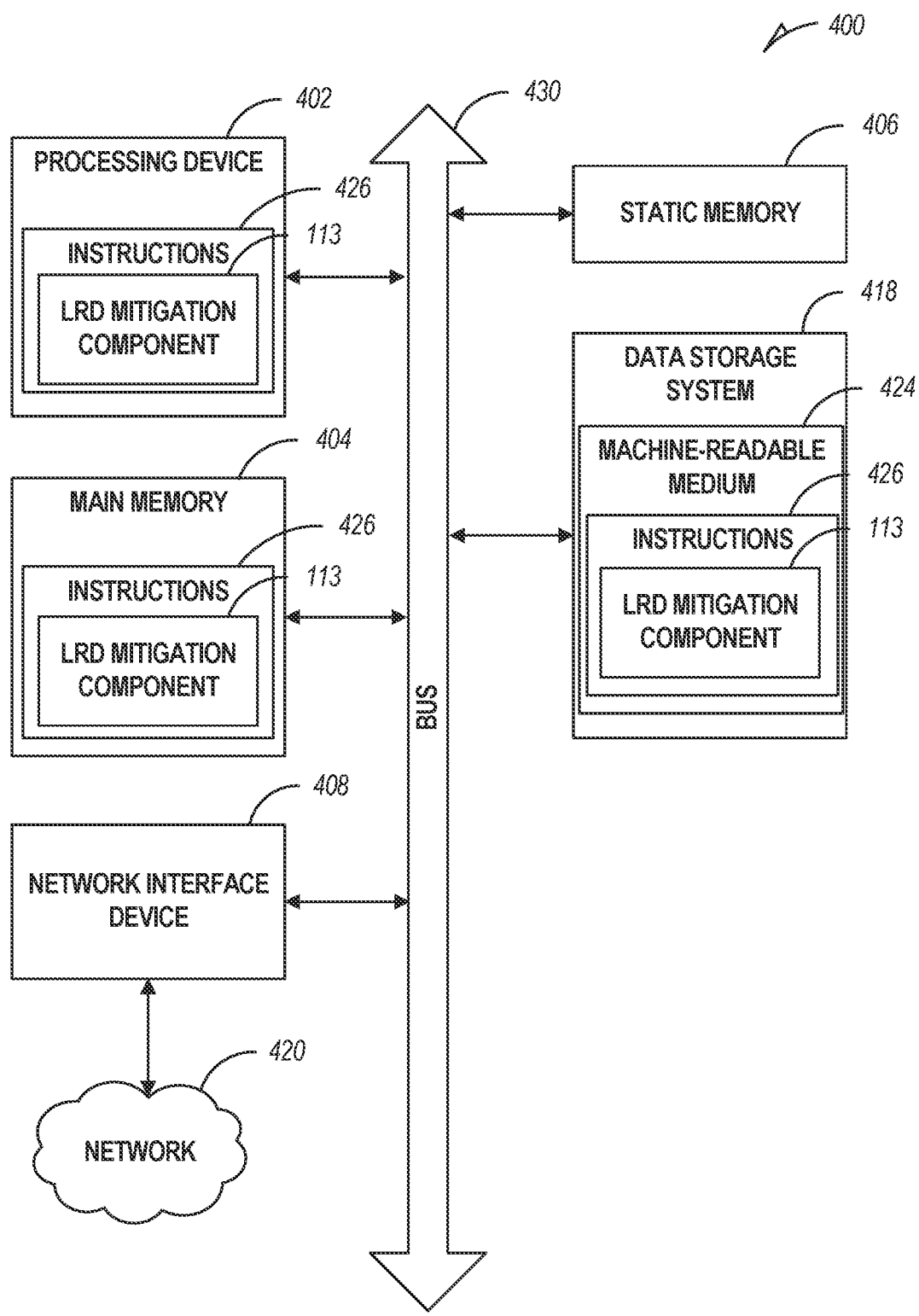
FIG. 4 is a block diagram of an example computer system in which embodiments of the present disclosure may operate.

FIG. 4 illustrates an example machine in the form of a computer system 400 within which a set of instructions can be executed for causing the machine to perform any one or more of the methodologies discussed herein. FIG. 4 illustrates an example machine of a computer system 400 within which a set of instructions can be executed for causing the machine to perform any one or more of the methodologies discussed herein. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the LRD mitigation component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., ROM, flash memory, DRAM such as SDRAM or RDRAM, etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device 402 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an ASIC, a FPGA, a digital signal processor (DSP), network processor, or the like. The processing device 402 is configured to execute instructions 426 for performing the operations and steps discussed herein. The computer system 400 can further include a network interface device 408 to communicate over a network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a data destruction component (e.g., the LRD mitigation component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
detecting a power state transition of a block of the memory device based on receiving, from the memory device, a signal indicating that the block is being placed in a low power state based on an anticipated idling of the block; and
in response to detecting the power state transition of the block, placing the block of the memory device in a stable state to mitigate latent read disturb in the block, the placing of the block in the stable state comprising sending a command to the memory device that causes the memory device to ground word lines in the block.

2. The system of claim 1, wherein:
the block is a first block; and
the operations further comprise:
detecting a background scan being performed on a second block; and
placing the second block in a stable state in response to detecting the background scan being performed on the second block.

3. The system of claim 2, wherein detecting the background scan being performed on the second block comprises detecting a background scan being performed on a page in the second block.

4. The system of claim 1, wherein:
the block is a first block; and
the operations further comprise:
detecting an impending power down event at the memory device; and
placing a second block in a stable state in response to detecting the impending power down event.

5. The system of claim 4, wherein:
the signal is a first signal;
the detecting of the impending power down even is based on receiving a second signal indicating that power down of the memory device is imminent.

6. The system of claim 1, wherein the word lines in the block are floating prior to being grounded.

7. The system of claim 1, wherein:
the memory device comprises a set of blocks; and
the placing of the block of the memory device in the stable state comprises placing the set of blocks in the stable state based on detecting the power state transition .

8. A method comprising:
detecting, by a processing device, a power state transition of a block of a memory device based on receiving, from the memory device, a signal indicating that the block is being placed in a low power state based on an anticipated idling of the block; and
in response to detecting the power state transition of the block, placing, by the processing device, the block of the memory device in a stable state to mitigate latent read disturb in the block , the placing of the block in the stable state comprising sending a command to the memory device that causes the memory device to ground word lines in the block .

9. The method of claim 8, wherein:
the block is a first block; and
the method further comprises:
detecting a background scan being performed on a second block; and
placing the second block in a stable state in response to detecting the background scan being performed on the second block.

10. The method of claim 9, wherein the detecting of the background scan being performed on the second block includes accessing error event data.

11. The method of claim 8, wherein the word lines in the block are floating prior to being grounded.

12. The method of claim 8, wherein the memory device grounds the word lines in the block in response to the command.

13. The method of claim 8, wherein:
the memory device comprises a set of blocks; and
the placing of the block of the memory device in the stable state comprises placing the set of blocks in the stable state .

14. The method of claim 8, wherein:
the memory device comprises a set of blocks; and
the placing of the block of the memory device in the stable state comprises placing a sub-set of blocks from the set of blocks in the stable state .

15. A computer-readable storage medium comprising instructions that, when executed by a processing device, configure the processing device to perform operations comprising:
detecting a power state transition of a block of a memory device based on receiving, from the memory device, a signal indicating that the block is being placed in a low power state based on an anticipated idling of the block; and
in response to detecting the power state transition of the block, placing the block in a stable state to mitigate latent read disturb in the block, the placing of the block in the stable state comprising sending a command to the memory device that causes the memory device to ground word lines in the block.

16. The computer-readable storage medium of claim 15, wherein:
the block is a first block; and
the operations further comprise:
detecting a background scan being performed on a second block; and
placing the second block in a stable state in response to detecting the background scan being performed on the second block.

17. The computer-readable storage medium of claim 16, wherein the detecting of the background scan being performed on the second block includes accessing error event data.

18. The computer-readable storage medium of claim 15, wherein the word lines in the block are floating prior to being grounded.

19. The computer-readable storage medium of claim 15, wherein:
the memory device comprises a set of blocks; and
the placing of the block of the memory device in the stable state comprises placing the set of blocks in the stable state.

20. The computer-readable storage medium of claim 15, wherein:
the memory device comprises a set of blocks; and
the placing of the block of the memory device in the stable state comprises placing a sub-set of blocks from the set of blocks in the stable state.

* * * * *